No. 777,905.　　　　　　　　　　　　　　　Patented December 20, 1904.

UNITED STATES PATENT OFFICE.

MAXIMILIAN KUNER, OF DENVER, COLORADO.

APPARATUS FOR MAKING VINEGAR.

SPECIFICATION forming part of Letters Patent No 777,905, dated December 20, 1904.

Application filed May 4, 1904. Serial No. 206,342.

*To all whom it may concern:*

Be it known that I, MAXIMILIAN KUNER, a citizen of the United States, residing in the city and county of Denver, and State of Colorado, have invented certain new and useful Improvements in Apparatus for Manufacturing Vinegar, of which the following is a specification.

My invention relates to apparatuses used in the manufacture of vinegar, but is more particularly directed to means for the automatic distribution of vinegar-mash to vinegar-generators; and broadly it consists of a tilting vehicle, called a "dumper," which is capable of supplying from four to six or more generators at stipulated intervals.

Figure 1:
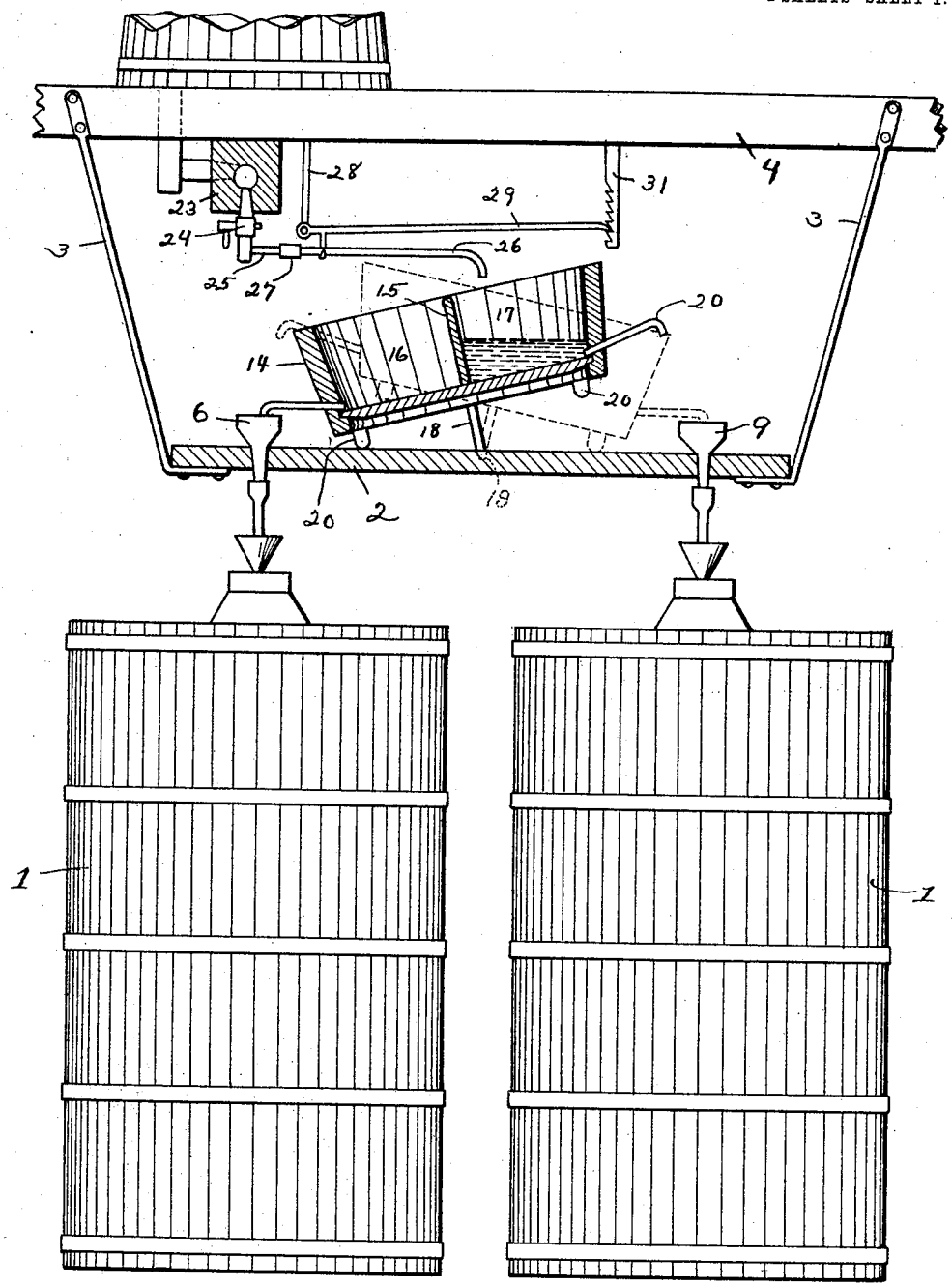
Figure 2:
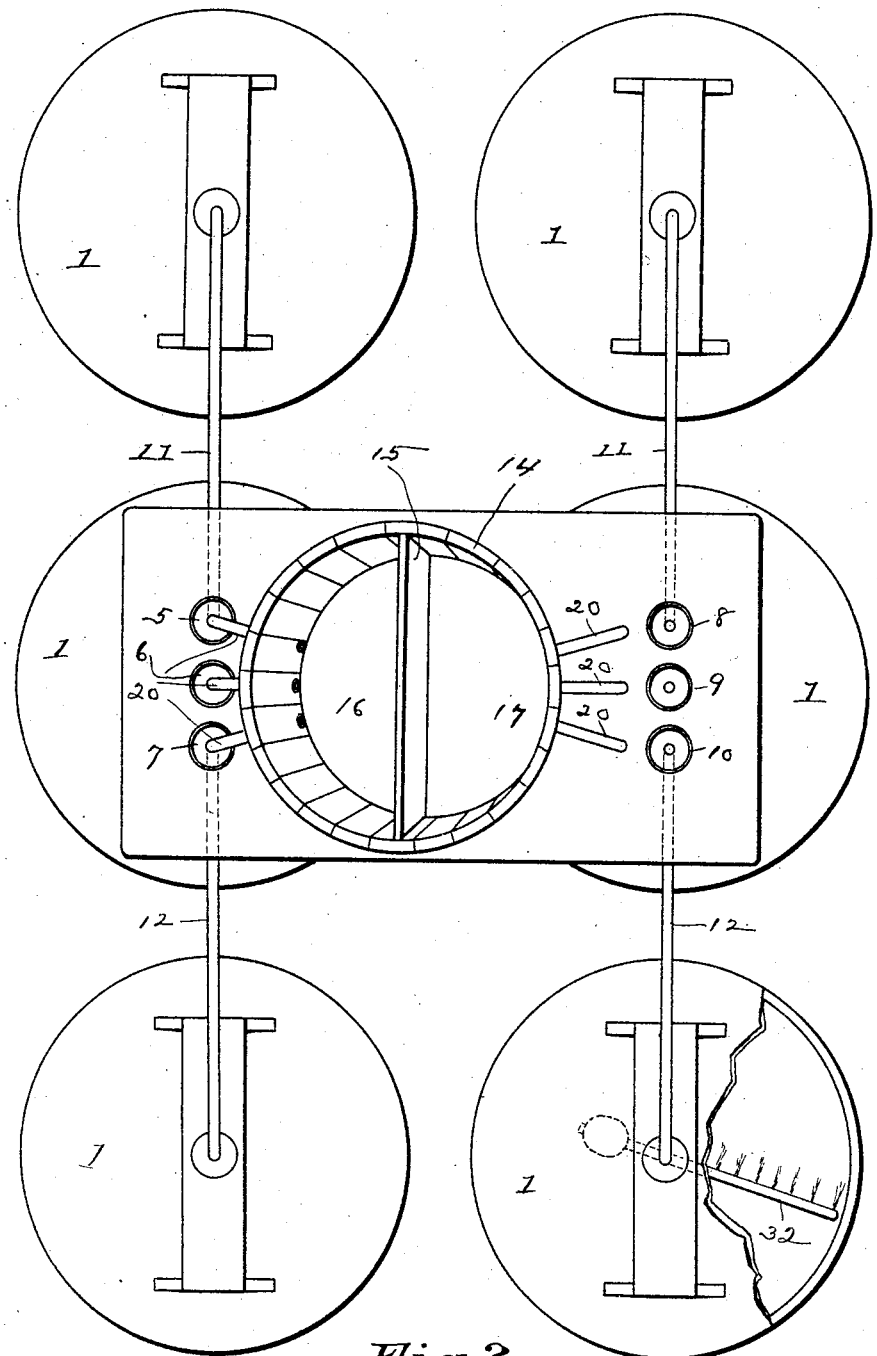

In the drawings, Figure 1 is a side elevation of the apparatus for the manufacture of vinegar embodying my invention. Fig. 2 is a top plan view of the same, parts being broken away.

1 represents the generators, of which I have shown six in the drawings for the purpose of illustration.

2 is a platform suspended, by means of rods 3, immediately over the central pair of generators, said rods 3 being suspended over a support 4.

The platform 2 is provided with six funnels 5, 6, 7, 8, 9, and 10, the funnels 5 and 7 being connected to the two end generators by means of a suitable pipe 11, while the funnels 8 and 10 are connected to the other two end generators by means of pipes 12. The funnels 6 and 9 run directly into a funnel 13, leading into the central generators.

14 is a tilting vehicle divided by a transverse partition 15 into two compartments 16 and 17, said vehicle having a pivot 18, seated in a suitable depression 19 (shown by dotted lines) in the upper face of the platform 2.

20 represents rubber-cork dumpers placed upon the under side of the dumping trough or vehicle, at each side thereof, as clearly shown in Fig. 1. This dumping-vehicle is provided with a series of discharge-tubes 22, leading from the interior thereof through the sides of said vehicle and having a downwardly-bent outer end. It will be seen from the drawing that these tubes are inclined upwardly, so that the uppermost point of the tube is practically on a line drawn midway of the depth of the tilting vehicle or trough, said tubes extending from the trough a distance that will enable them when the trough is in proper position to enter the funnels 5 to 10, as shown in the drawings.

Secured to the support 4 is the usual pump-logging 23, through which the vinegar-mash is delivered to the generators through an intermediate apparatus.

24 is a wooden spigot leading from the pump-logging, to which is secured a glass tube 25. 26 is another glass tube which is secured to the glass tube 25 by means of a rubber or other resilient tube 27, thus providing a glass tube having a flexible joint leading from the wooden spigot and forming a passage-way for the mash from the pump-logging into the tilting trough or vehicle.

28 is a bracket suspended from the support 4, to which is pivoted a lever 29, said lever being provided with a depending hook 30, in which the glass tube 26 is supported and suspended, whereby said glass tube may be elevated or depressed, according as the flow of mash is desired. The lever is held in the desired position by means of its engagement with a toothed bar 31.

In the operation of the device the mash passes from the pump-logging into the spigot 24, thence through the glass tubes into one of the compartments of the tilting vehicle or trough, and as soon as a certain amount of mash has been delivered into one of these compartments its weight causes the tilting trough to dump to one side, thus swinging the tubes 22 on that side of the vehicle into their corresponding funnels on the platform 2, whereupon the mash is free to pass through said tubes, through the funnels in the platform-tube, and thence into the generators through the sprinkler 32. While the mash is being emptied from the compartment just filled, the other compartment has been brought under the discharge end of the glass tube 26, and the mash continuing to run fills this second compartment with a certain amount of mash, whereupon the weight of the mash in the second compartment again tilts the vehicle or trough, so that the tubes 22 upon this side of the dumping-vehicle are entered in their funnels on the platform 2, and thence the mash runs to the other series of generators. Of course it is understood that the mash passing in the funnels on the platform 2 passes to the end generators by means of the pipes 11 and 12, while the mash enters the central generators direct.

It will be seen that the dumping of the tilting vehicle is effected automatically by means of liquor under treatment, thus obviating any special operating mechanism.

By means of the lever 29 I am enabled to elevate or depress the glass tube 26, and thus control the amount of liquor to the dumper.

What is known as the "sprinkling" system has been more or less discarded in this art inasmuch as the apparatus heretofore in use has been found impracticable when used with the sprinkling system, whereas with my system the unused sprinkling system can be used inasmuch as my invention provides for an exact and even distribution of the liquid to the vinegar-shaving and dispenses with the perforated bottoms heretofore used, the holes in which are liable to clog up and prevent the equal distribution of the liquid. Another reason why the sprinkling system was discarded is that it was found impossible to supply the generators with a specific amount of liquid at specific intervals except by manual labor. By my invention, as will be understood from the description given, I am enabled to supply the generators with a specific amount of liquid at specific intervals.

As distinguished from the old dumper system, wherein one faucet supplied each single dumper and the stream from such faucet had of necessity to be very small, and thus subject to frequent clogging, whereas by my system I am enabled to supply from four to six generators at one time, and thus admit of a very large stream supplied by the glass tubes 25 and 26, and inasmuch as these tubes can be constructed of a large diameter I obviate the objectionable clogging.

It is obvious that changes may be made in the several parts of my invention without departing from the scope thereof. Hence I would have it understood that I do not limit myself to the exact details of construction shown.

What I claim is—

1. In a device for the manufacture of vinegar, the combination with a dumper, of a tube secured to said dumper at an angle to the bottom thereof and communicating with the interior of said dumper.

2. In a device for the manufacture of vinegar, the combination with a dumper, of a tube extending upwardly therefrom and exterior thereof at an angle less than a right angle to the bottom of the dumper.

3. In a vinegar apparatus, the combination with a series of generators, of an oscillatory dumper having two compartments, a series of upwardly-inclined tubes leading from each compartment and discharging into the generators, pump-logging, a flexible jointed tube leading from the logging into said compartments and a lever secured to the said jointed tube to control its discharge, said dumper being oscillated by the liquid delivered into its compartments from the flexible jointed tube.

In testimony whereof I affix my signature in presence of two witnesses.

MAXIMILIAN KUNER.

Witnesses:
W. SCOTT BICKSLER,
ERVIN F. WITBECK.